United States Patent
Mori et al.

(10) Patent No.: US 12,157,391 B2
(45) Date of Patent: Dec. 3, 2024

(54) CONTROL DEVICE, COMPUTER READABLE RECORDING MEDIUM AND POWER MANAGEMENT SYSTEM

(71) Applicant: TOYOTA JIDOSHA KABUSHIKI KAISHA, Toyota (JP)

(72) Inventors: Junichi Mori, Nagakute (JP); Kentaro Ban, Susono (JP); Tatsuro Kiyohara, Hiratsuka (JP); Yuta Maniwa, Susono (JP); Yuki Nishikawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 497 days.

(21) Appl. No.: 17/658,500

(22) Filed: Apr. 8, 2022

(65) Prior Publication Data

US 2022/0396173 A1  Dec. 15, 2022

(30) Foreign Application Priority Data

Jun. 10, 2021 (JP) ................................ 2021-097548

(51) Int. Cl.
*B60L 55/00* (2019.01)
*B60L 53/36* (2019.01)
*B60L 53/60* (2019.01)

(52) U.S. Cl.
CPC .............. *B60L 55/00* (2019.02); *B60L 53/36* (2019.02); *B60L 53/60* (2019.02); *B60L 2240/667* (2013.01); *B60L 2240/70* (2013.01); *Y04S 30/12* (2013.01)

(58) Field of Classification Search
CPC .......... Y04S 30/12; B60L 55/00; B60L 53/36; B60L 53/60; B60L 2240/667; B60L 2240/70; B60L 53/68; Y02T 10/70; Y02T 10/7072

See application file for complete search history.

(56) References Cited

FOREIGN PATENT DOCUMENTS

| JP | 2015-032286 A | | 2/2015 | |
|---|---|---|---|---|
| JP | 2018-172119 A | | 11/2018 | |
| JP | 2019086843 A | * | 6/2019 | .............. B60L 50/00 |
| JP | 2020-113130 A | | 7/2020 | |
| JP | 2020-114051 A | | 7/2020 | |
| JP | 2020-123012 A | | 8/2020 | |
| JP | 2020-140391 A | | 9/2020 | |
| JP | 2021-60845 A | | 4/2021 | |
| JP | 2022073760 A | * | 5/2022 | ................ B60L 1/00 |

OTHER PUBLICATIONS

English translation of JP-2019086843-A (Year: 2019).*
English translation of JP-2022073760-A (Year: 2022).*

* cited by examiner

*Primary Examiner* — Shon G Foley
(74) *Attorney, Agent, or Firm* — Oblon, McClelland, Maier & Neustadt, L.L.P.

(57) ABSTRACT

A control device includes a processor configured to output, in a case where communication between a server instructing a power feeding vehicle to proceed for power feeding to a feeding target facility and the power feeding vehicle is interrupted, a control signal for causing the power feeding vehicle to move to an installation site of the server.

20 Claims, 8 Drawing Sheets

CONTROL DEVICE, COMPUTER READABLE RECORDING MEDIUM AND POWER MANAGEMENT SYSTEM

The present application claims priority to and incorporates by reference the entire contents of Japanese Patent Application No. 2021-097548 filed in Japan on Jun. 10, 2021.

BACKGROUND

The present disclosure relates to a control device, a computer readable recording medium and a power management system.

Japanese Patent Application Laid-open No. 2015-032286 discloses a power management system that informs a user, from a server, about a charging/discharging place in an area with excess power or insufficient power, and that gives an incentive when charging/discharging is performed by a vehicle.

SUMMARY

When a power shortage is caused in a server due to a power failure or the like at the time of disaster, communication between a power feeding vehicle and the server is interrupted.

There is a need for a control device, a computer readable recording medium and a power management system that enable power feeding from a power feeding vehicle to a server when communication between the power feeding vehicle and the server is interrupted.

According to one aspect of the present disclosure, there is provided a control device including: a processor configured to output, in a case where communication between a server instructing a power feeding vehicle to proceed for power feeding to a feeding target facility and the power feeding vehicle is interrupted, a control signal for causing the power feeding vehicle to move to an installation site of the server.

DETAILED DESCRIPTION

Hereinafter, an embodiment of a control device, a computer readable recording medium storing a program and a power management system according to the present disclosure will be described. Note that the present disclosure is not limited to the present embodiment.

Figure 1:
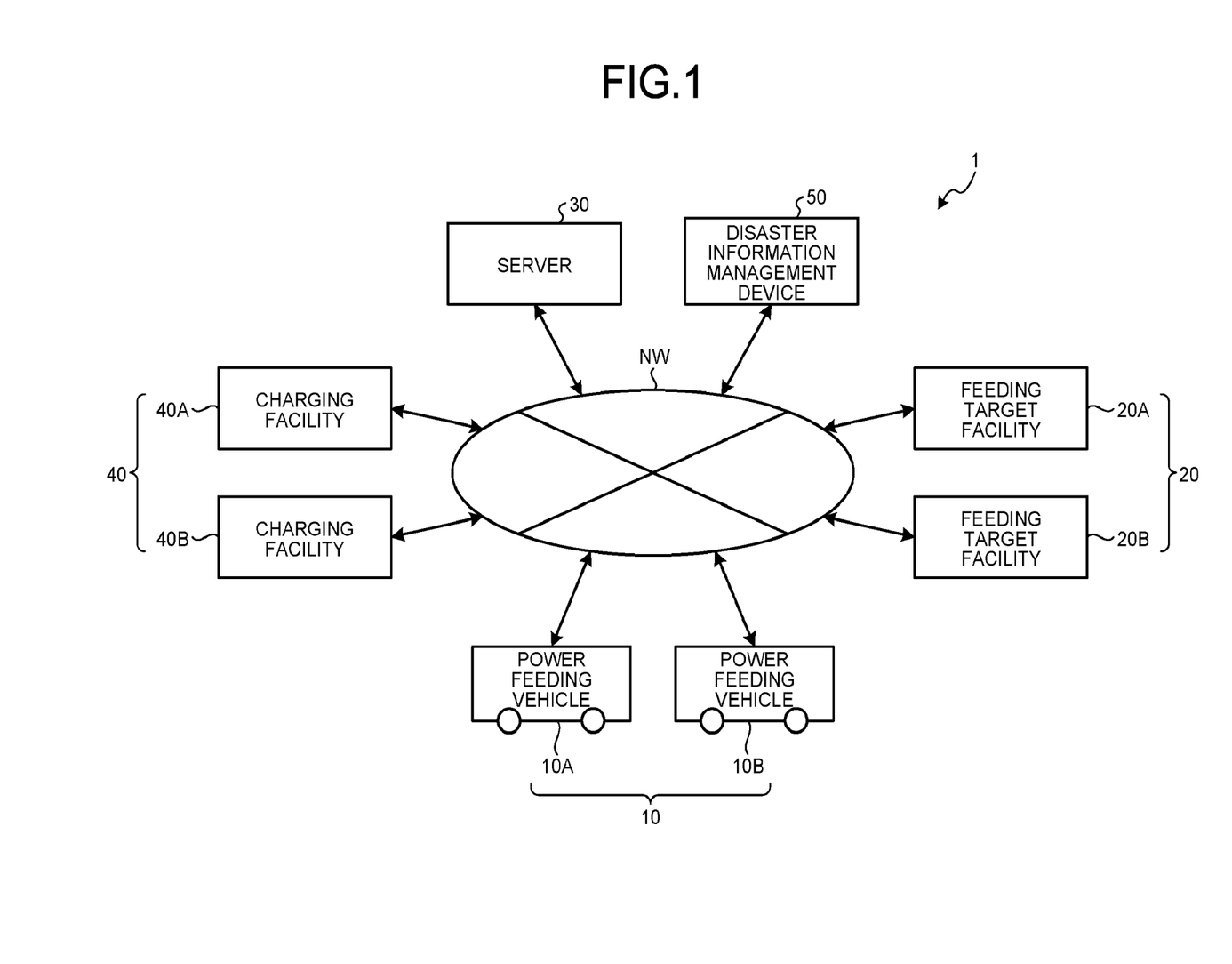
FIG. 1 is a view schematically illustrating a configuration of a power management system according to an embodiment.

FIG. 1 is a view schematically illustrating a configuration of a power management system 1 according to the embodiment. As illustrated in FIG. 1, the power management system 1 according to the embodiment includes a power feeding vehicle 10, a feeding target facility 20, a server 30, a charging facility 40, and a disaster information management device 50. For example, the power management system 1 manages power feeding from the power feeding vehicle 10 to the feeding target facility 20 by the server 30.

The power feeding vehicle 10, the feeding target facility 20, the server 30, the charging facility 40, and the disaster information management device 50 are configured to be able to communicate with each other through a network NW. This network NW is, for example, a public communication network such as the Internet, and may include other communication networks such as a wide area network (WAN), a telephone communication network, and a wireless communication network such as Wi-Fi (registered trademark).

Furthermore, for example, the communication between the power feeding vehicle 10 and the server 30 is not necessarily performed through the network NW, and the power feeding vehicle 10 and the server 30 may be able to directly communicate with each other without the network NW. As a result, even in a case where the network NW may not be used at the time of disaster, it is possible to directly issue an instruction from the server 30 to the power feeding vehicle 10 and to cause the power feeding vehicle 10 to proceed to the feeding target facility 20.

The power feeding vehicle 10 is an autonomous traveling vehicle configured to be able to autonomously travel according to at least a given traveling command. The power feeding vehicle 10 includes a power feeding vehicle 10A that performs charging/discharging in a non-contact manner, and a power feeding vehicle 10B that performs charging/discharging in a contact manner. Note that the power feeding vehicle 10A and the power feeding vehicle 10B will be simply described as the power feeding vehicle 10 in the following description unless otherwise distinguished.

The feeding target facility 20 is an important facility such as a hospital to which the power feeding vehicle 10 is caused to proceed for power feeding at the time of the disaster. The feeding target facility 20 includes a feeding target facility 20A that receives power from the power feeding vehicle 10A in a non-contact manner, and a feeding target facility 20B that receives power from the power feeding vehicle 10B in a contact manner. Note that the feeding target facility 20A and the feeding target facility 20B will be simply described as the feeding target facility 20 in the following description unless otherwise distinguished.

The charging facility 40 is a facility that charges an in-vehicle battery 16 provided in the power feeding vehicle 10. The charging facility 40 includes a charging facility 40A that performs charging in a non-contact manner, and a charging facility 40B that performs charging in a contact manner. Note that the charging facility 40A and the charging facility 40B will be simply described as the charging facility 40 in the following description unless otherwise distinguished.

The disaster information management device 50 is, for example, a device that outputs disaster information through the network NW to the server 30 installed in a corresponding area. The disaster information management device 50 acquires information related to disasters such as a heavy rain, flood, typhoon, and earthquake (hereinafter, also referred to as disaster information) from, for example, a public institution or private institution that transmits a weather forecast, a disaster prevention center of a national or local government, and the like. Note that the disaster information also includes predicted occurrence time of disaster predicted in the future.

Figure 2:
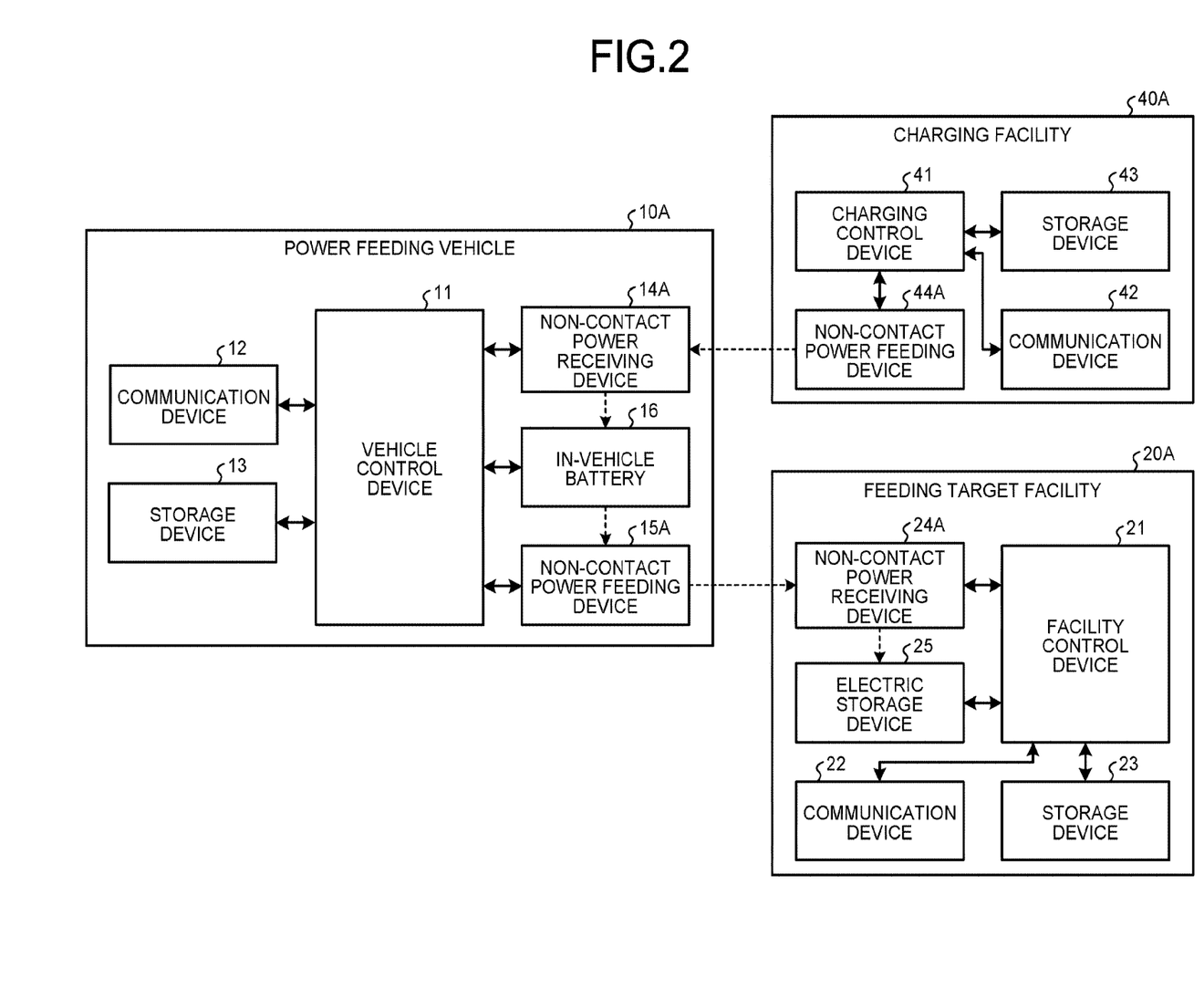
FIG. 2 is a schematic configuration diagram of a power feeding vehicle, a feeding target facility, and a charging facility that exchange power in a non-contact manner.

FIG. 2 is a schematic configuration diagram of the power feeding vehicle 10A, the feeding target facility 20A, and the charging facility 40A that exchange power in a non-contact manner.

The power feeding vehicle 10A includes a vehicle control device 11, a communication device 12, a storage device 13, a non-contact power receiving device 14A, a non-contact power feeding device 15A, and an in-vehicle battery 16.

The vehicle control device 11 includes a processor including a central processing unit (CPU), a digital signal processor (DSP), a field-programmable gate array (FPGA), and the like, and a memory including a random access memory (RAM), a read only memory (ROM), and the like. By loading and executing a program, which is stored in the storage device 13, in a work area of the memory and controlling each configuration unit and the like through execution of the program, the vehicle control device 11 realizes a function that meets a predetermined purpose.

The communication device 12 includes, for example, a local area network (LAN) interface board, a wireless communication circuit for wireless communication, and the like. The communication device 12 is connected to the network NW that is a public communication network, such as the Internet. Then, the communication device 12 communicates with the feeding target facility 20 and the server 30 by being connected to the network NW.

The storage device 13 includes recording media such as an erasable programmable ROM (EPROM), a hard disk drive (HDD), and a removable medium. Examples of the removable medium include recording media such as an optical disk (such as compact disc (CD)-R, CD-ROM, digital versatile disc (DVD)-R, DVD-ROM, or Blu-ray (registered trademark) disc (BD)), and a flash memory (such as universal serial bus (USB) memory or memory card). The storage device 13 may store an operating system (OS), various programs, various tables, various databases, and the like.

With a power receiving coil included in the non-contact power receiving device 14A and a power transmitting coil included in a non-contact power feeding device 44A provided in the charging facility 40A being made close to each other, the non-contact power receiving device 14A receives power from the non-contact power feeding device 44A in a non-contact manner via the power receiving coil and the power transmitting coil. The power received by the non-contact power receiving device 14A is stored in the in-vehicle battery 16.

With a power transmitting coil included in the non-contact power feeding device 15A and a power receiving coil included a non-contact power receiving device 24A provided in the feeding target facility 20A being made close to each other, the non-contact power feeding device 15A feeds power to the non-contact power receiving device 24A in a non-contact manner via the power transmitting coil and the power receiving coil.

The in-vehicle battery 16 includes, for example, a secondary battery such as a nickel hydrogen battery or a lithium-ion battery, and supplies power to a drive device including a motor, inverter, and the like of the power feeding vehicle 10A.

The feeding target facility 20A includes a facility control device 21, a communication device 22, a storage device 23, the non-contact power receiving device 24A, and an electric storage device 25. Note that physical configurations of the facility control device 21, the communication device 22, and the storage device 23 are similar to, for example, those of the vehicle control device 11, the communication device 12, and the storage device 13 included in the power feeding vehicle 10A. The electric storage device 25 includes, for example, a secondary battery such as a nickel hydrogen battery or a lithium-ion battery, and stores power used in the feeding target facility 20. In the feeding target facility 20A, the non-contact power receiving device 24A receives power in a non-contact manner from the non-contact power feeding device 15A provided in the power feeding vehicle 10A, and the power is stored in the electric storage device 25.

The charging facility 40A includes a charging control device 41, a communication device 42, a storage device 43, and the non-contact power feeding device 44A. Note that physical configurations of the charging control device 41, the communication device 42, and the storage device 43 are similar to, for example, those of the vehicle control device 11, the communication device 12, and the storage device 13 included in the power feeding vehicle 10A. In the charging facility 40A, the non-contact power receiving device 44A feeds power in a non-contact manner to the non-contact power receiving device 14A provided in the power feeding vehicle 10A.

Figure 3:
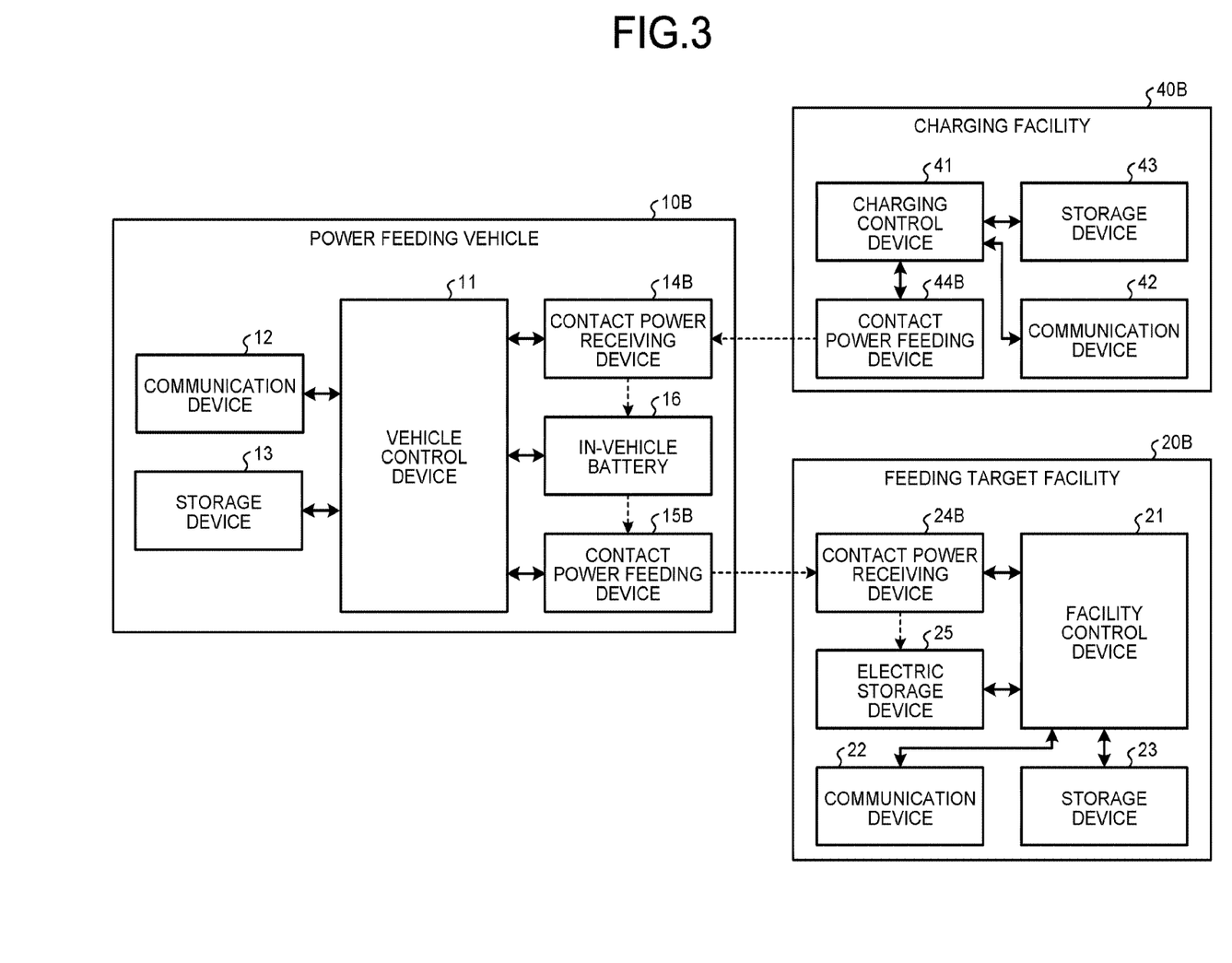
FIG. 3 is a schematic configuration diagram of a power feeding vehicle, a feeding target facility, and a charging facility that exchange power in a contact manner.

FIG. 3 is a schematic configuration diagram of the power feeding vehicle 10B, the feeding target facility 20B, and the charging facility 40B that exchange power in a contact manner.

As illustrated in FIG. 3, the power feeding vehicle 10B includes a vehicle control device 11, a communication device 12, a storage device 13, a contact power receiving device 14B, a contact power feeding device 15B, and an in-vehicle battery 16. Note that physical configurations of the vehicle control device 11, the communication device 12, the storage device 13, and the in-vehicle battery 16 are similar to those of the vehicle control device 11, the communication device 12, the storage device 13, and the in-vehicle battery 16 included in the power feeding vehicle 10A. The contact power receiving device 14B receives power through a connection cable from a contact power feeding device 44B provided in the charging facility 40B. The power received by the contact power receiving device 14B is stored in the in-vehicle battery 16. The contact power feeding device 15B feeds power through a connection cable to a contact power receiving device 24B provided in a feeding target facility 20B.

The feeding target facility 20B includes a facility control device 21, a communication device 22, a storage device 23, a contact power receiving device 24B, and an electric storage device 25. Note that physical configurations of the facility control device 21, the communication device 22, the storage device 23, and the electric storage device 25 are similar to, for example, those of the facility control device 21, the communication device 22, the storage device 23, and the electric storage device 25 included in the feeding target facility 20A. In the feeding target facility 20B, the contact power receiving device 24B receives power through the connection cable from the contact power feeding device 15B provided in the power feeding vehicle 10B, and the power is stored in the electric storage device 25.

The charging facility 40B includes a charging control device 41, a communication device 42, a storage device 43, and a contact power feeding device 44B. Note that physical configurations of the charging control device 41, the communication device 42, and the storage device 43 are similar to, for example, the charging control device 41, the communication device 42, and the storage device 43 included in the charging facility 40A. In the charging facility 40B, the contact power feeding device 44B provides power through a connection cable to the contact power receiving device 14B provided in the power feeding vehicle 10B.

Figure 4:
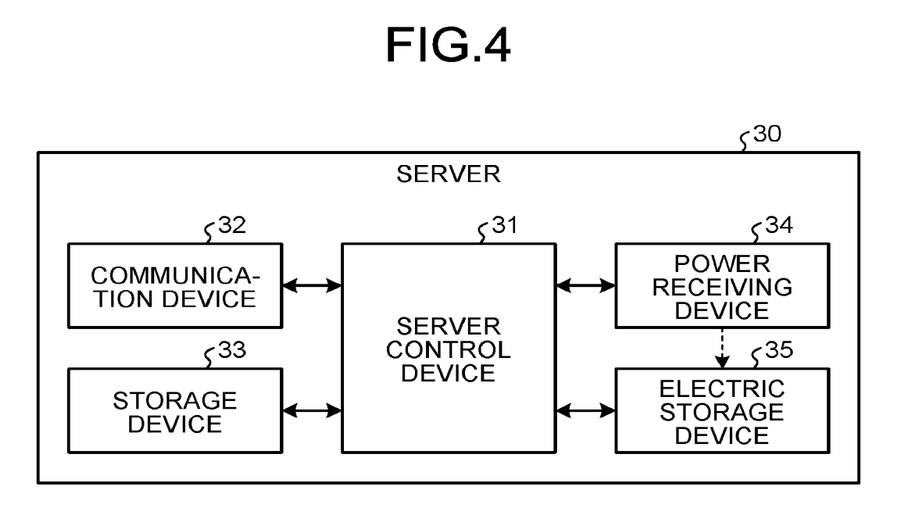
FIG. 4 is a view illustrating a schematic configuration of a server.

FIG. 4 is a view illustrating a schematic configuration of the server 30. The server 30 includes a server control device 31, a communication device 32, a storage device 33, a power receiving device 34, and an electric storage device 35. Physical configurations of the server control device 31, the communication device 32, the storage device 33, and the electric storage device 35 are similar to, for example, those of the vehicle control devices 11, the communication devices 12, and the storage devices 13 included in the power feeding vehicles 10A and 10B.

The server control device 31 acquires positional information of the power feeding vehicle 10, SOC information of the in-vehicle battery 16, the disaster information from the disaster information management device 50, and the like through the network NW and the like. The storage device 33 stores vehicle information such as a charging/discharging method of the power feeding vehicle 10, facility information such as positional information and a charging method of the feeding target facility 20, various kinds of information acquired through the communication device 32, and the like. The power receiving device 34 is configured to be capable of receiving power by at least one of a non-contact method or a contact method, and may receive power from at least one of the power feeding vehicle 10A or the power feeding vehicle 10B by non-contact power feeding or contact power feeding. The power received by the power receiving device 34 is stored in the electric storage device 35.

The server 30 is a management server that manages a plurality of the power feeding vehicles 10 including the power feeding vehicles 10A and 10B, and that comprehensively manages the power management system 1 that feeds, by the power feeding vehicles 10A and 10B, power to a plurality of the feeding target facilities 20 including the feeding target facilities 20A and 20B. For example, the server 30 allocates the power feeding vehicles 10 according to degrees of importance of the feeding target facilities 20 at the time of the disaster, and instructs the power feeding vehicles 10 to proceed to the feeding target facilities 20 for power feeding.

Figure 5:
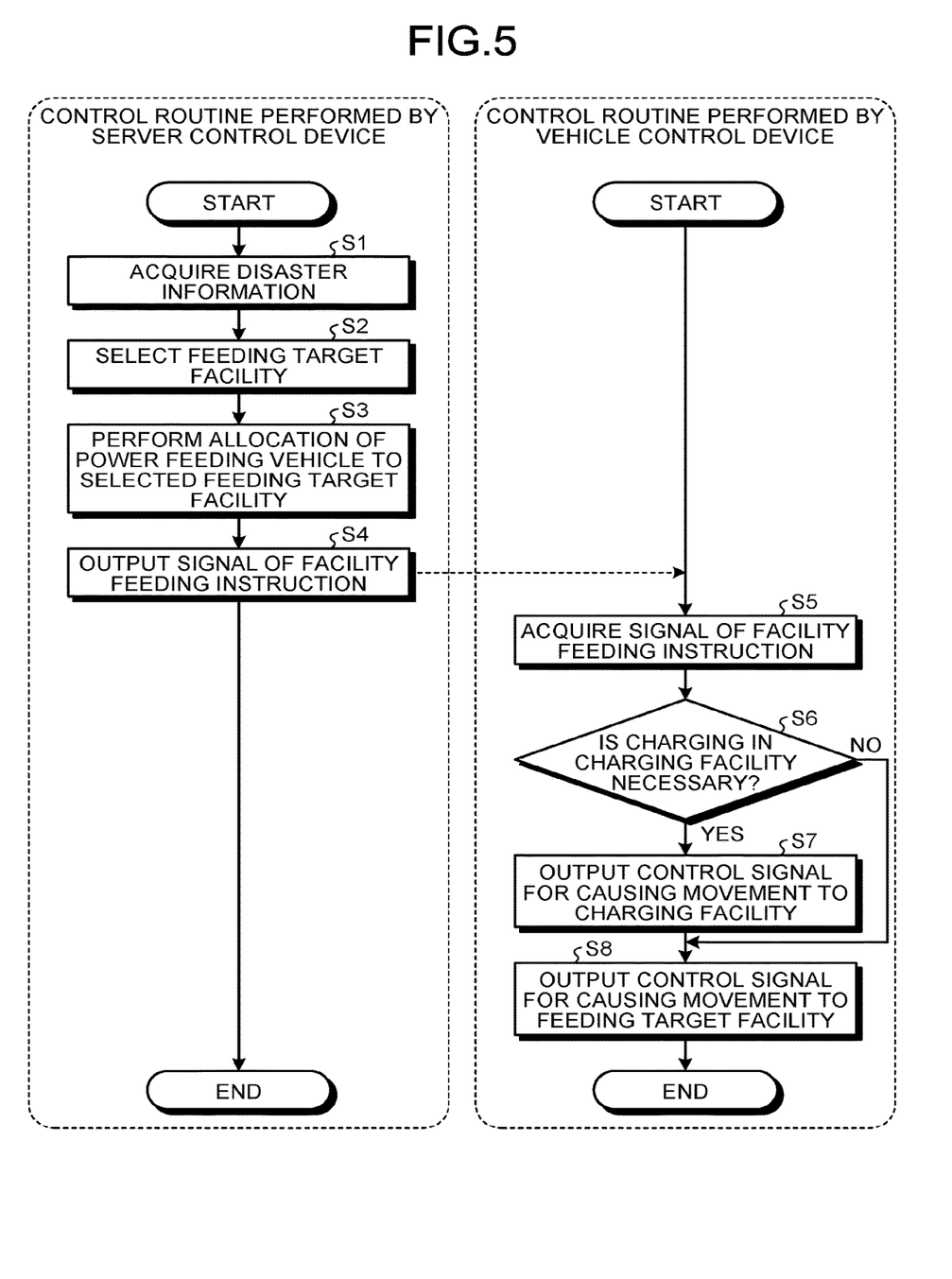
FIG. 5 is a flowchart illustrating a power management control routine performed by the power management system.

FIG. 5 is a view illustrating a power management control routine performed by the power management system 1. Note that the power management control routine illustrated in FIG. 5 is performed by cooperation of the vehicle control device 11 and the server control device 31, and includes a control routine executed by the vehicle control device 11 and a control routine executed by the server control device 31.

First, the server control device 31 acquires the disaster information from the disaster information management device 50 through the network NW or the like (Step S1). Subsequently, based on the acquired disaster information, the server control device 31 selects a feeding target facility 20 according to a degree of importance of the facility at the time of the disaster (Step S2). Then, the server control device 31 allocates a power feeding vehicle 10 to the selected feeding target facility 20 (Step S3). At this time, the server control device 31 selects the power feeding vehicle 10 to be headed to the feeding target facility 20 based on information such as a power feeding method of the feeding target facility 20, and a positional relationship between the feeding target facility 20 and the power feeding vehicle 10. For example, the server control device 31 selects the power feeding vehicle 10A provided with the non-contact power feeding device 15A for the feeding target facility 20A provided with the non-contact power receiving device 24A. Also, the server control device 31 selects the power feeding vehicle 10B provided with the contact power feeding device 15B for the feeding target facility 20B provided with the contact power receiving device 24B. Also, the server control device 31 selects a power feeding vehicle 10 a current position of which is closer to the feeding target facility 20 than those of the other power feeding vehicles 10. Subsequently, the server control device 31 outputs a signal of a facility feeding instruction for causing the selected power feeding vehicle 10 to proceed to the feeding target facility 20 for power feeding (Step S4). Then, the server control device 31 ends the present control routine.

Subsequently, the vehicle control device 11 acquires the signal of the facility feeding instruction from the server control device 31 through the network NW or the like (Step S5). Then, based on the SOC of the in-vehicle battery 16, the vehicle control device 11 determines whether charging in the charging facility 40 is necessary (Step S6). In a case of determining that charging in the charging facility 40 is necessary (Yes in Step S6), the vehicle control device 11 outputs, to the drive device, a control signal for moving the power feeding vehicle 10 to the charging facility 40 (Step S7), and proceeds to Step S8. On the other hand, in a case of determining that charging in the charging facility 40 is not necessary (No in Step S6), the vehicle control device 11 proceeds to Step S8. Subsequently, the vehicle control device 11 outputs, to the drive device, a control signal for moving the power feeding vehicle 10 to the feeding target facility 20 for the power feeding (Step S8). Then, the vehicle control device 11 ends the present control routine.

As a result, in the power management system 1 according to the embodiment, the power feeding vehicle 10 may be caused to proceed for the power feeding to the feeding target facility 20 having high importance at the time of the disaster, such as a hospital and the electric storage device 25 of the feeding target facility 20 may be charged by the power from the power feeding vehicle 10. Thus, even when a power shortage is caused in the feeding target facility 20 due to a power failure or the like, the power of the electric storage device 25 may be used to secure the communication between the power feeding vehicle 10 and the server 30.

In addition, in the power management system 1 according to the embodiment, when a power shortage is caused in the server 30 due to the power failure or the like at the time of the disaster, the communication between the power feeding vehicle 10 (vehicle control device 11) and the server 30 (server control device 31) is interrupted, and the server 30 may not instruct the power feeding vehicle 10 to proceed to the feeding target facility 20 for the power feeding. Thus, in the power management system 1 according to the embodiment, the server 30 previously gives, in a state in which the communication between the power feeding vehicle 10 and the server 30 may be performed, an instruction to the power feeding vehicle 10 that the power feeding vehicle 10 automatically heads to the server 30 for the power feeding when the communication between the power feeding vehicle 10 and the server 30 is interrupted. Then, when the communication between the power feeding vehicle 10 and the server 30 is interrupted, the power feeding vehicle 10 automatically heads to the server 30 for the power feeding.

Figure 6:
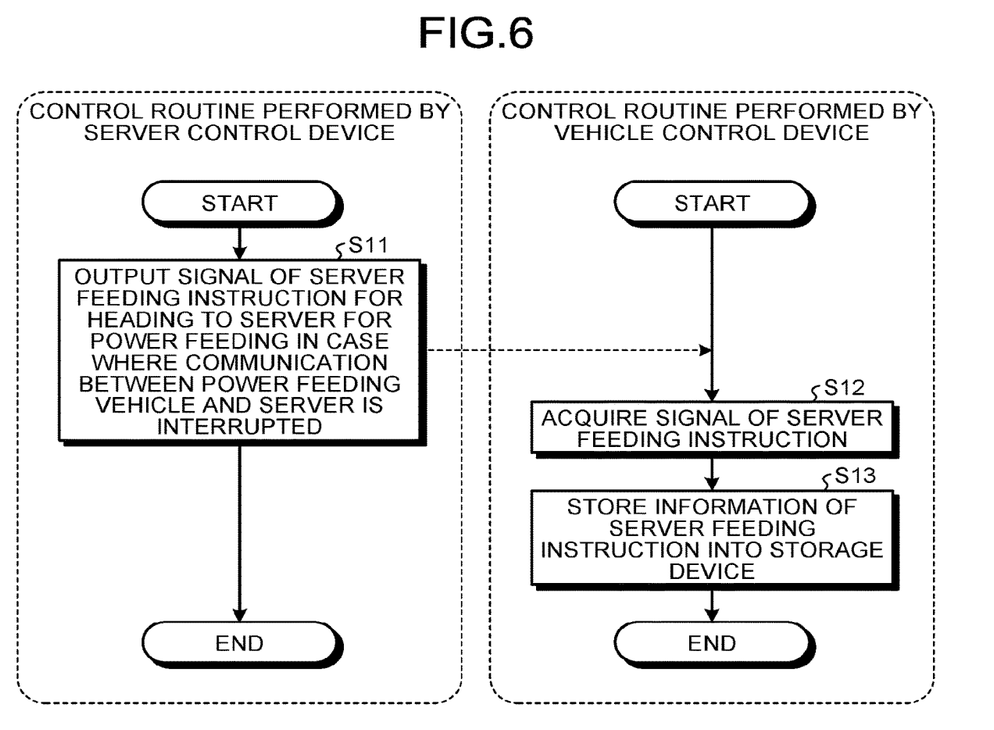
FIG. 6 is a flowchart illustrating a control routine of a server feeding instruction.

FIG. 6 is a view illustrating a control routine of a server feeding instruction. Note that the control routine of the server feeding instruction illustrated in FIG. 6 is performed by cooperation of the vehicle control device 11 and the server control device 31, and includes a control routine executed by the vehicle control device 11 and a control routine executed by the server control device 31.

First, in a state in which the communication with the vehicle control device 11 through the network NW or the like may be performed, the server control device 31 outputs, to the vehicle control device 11, a signal of the server feeding instruction for causing the power feeding vehicle 10 to automatically proceed to the server 30 for the power feeding in a case where the communication between the power feeding vehicle 10 and the server 30 is interrupted (Step S11), and ends the present control routine.

The vehicle control device 11 acquires the signal of the server feeding instruction from the server control device 31 through the network NW or the like (Step S12). Then, the vehicle control device 11 stores information of the acquired server feeding instruction into the storage device 13 (Step S13), and ends the present control routine.

Figure 7:
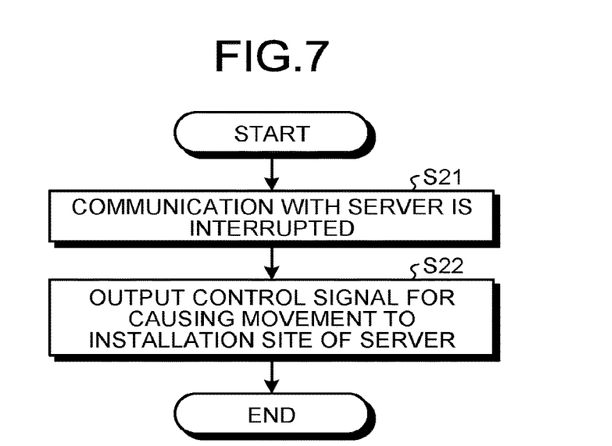
FIG. 7 is a flowchart illustrating a server feeding control routine at the time of communication interruption.

FIG. 7 is a view illustrating a server feeding control routine at the time of communication interruption. Note that the server feeding control routine illustrated in FIG. 7 includes a control routine executed by the vehicle control device 11 based on the information of the server feeding instruction stored in advance in the storage device 13 of the power feeding vehicle 10.

For example, in a case of not being able to acquire a connection checking signal output from the server control device 31, the vehicle control device 11 determines that the communication with the server 30 is interrupted (Step S21). Then, based on the information of the server feeding instruction stored in advance in the storage device 13, the vehicle control device 11 causes the power feeding vehicle 10 to automatically proceed to the server 30 for the power feeding (Step S22), and ends the present control routine.

As a result, even when the power shortage is caused in the server 30 due to the power failure or the like at the time of the disaster and the communication between the power feeding vehicle 10 and the server 30 is interrupted, the power may be fed from the power feeding vehicle 10 to the server 30. Thus, the power shortage in the server 30 may be resolved and the communication between the power feeding vehicle 10 and the server 30 may be secured.

Furthermore, in the power management system 1 according to the embodiment, based on the disaster information from the disaster information management device 50, the in-vehicle battery 16 of the power feeding vehicle 10 may be charged before the predicted occurrence time of the disaster predicted in the future.

Figure 8:
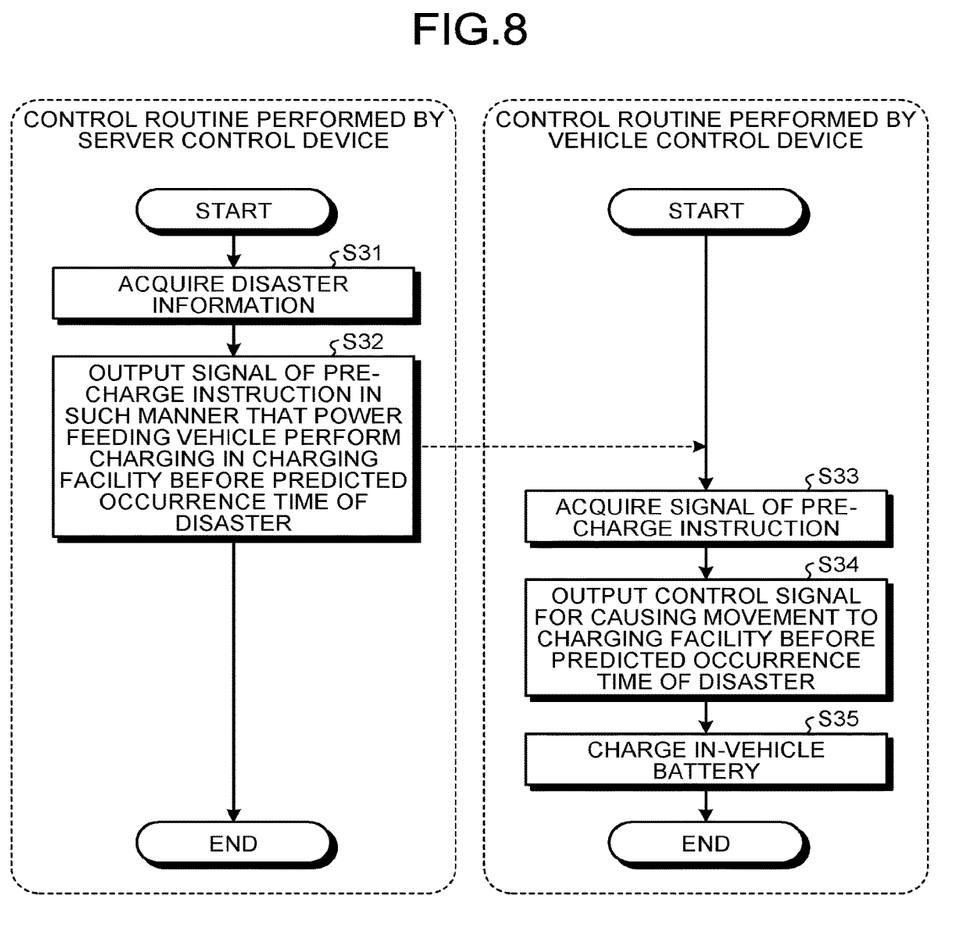
FIG. 8 is a flowchart illustrating a pre-charge control routine of an in-vehicle battery.

FIG. 8 is a view illustrating a pre-charge control routine of the in-vehicle battery 16. Note that the pre-charge control routine illustrated in FIG. 8 is performed by cooperation of the vehicle control device 11 and the server control device 31, and includes a control routine executed by the vehicle control device 11 and a control routine executed by the server control device 31.

First, the server control device 31 acquires the disaster information from the disaster information management device 50 through the network NW or the like (Step S31). Then, based on the acquired disaster information, the server control device 31 outputs a signal of a pre-charge instruction to the vehicle control device 11 through the network NW or the like in such a manner that the power feeding vehicle 10 performs charging in the charging facility 40 before the predicted occurrence time of the disaster (Step S32), and ends the present control routine.

The vehicle control device 11 acquires the signal of the pre-charge instruction from the server control device 31 through the network NW (Step S33). Subsequently, based on the acquired signal of the pre-charge instruction, the vehicle control device 11 outputs, to the drive device, a control signal for moving the power feeding vehicle 10 to the charging facility 40 before the predicted occurrence time of the disaster (Step S34). Then, the vehicle control device 11 charges the in-vehicle battery 16 by the charging facility 40 (Step S35), and ends the present control routine.

As a result, by charging the in-vehicle battery 16 of the power feeding vehicle 10 before the predicted occurrence time of the disaster predicted in the future, it is possible to secure the power to be fed from the power feeding vehicle 10 to the feeding target facility 20 at the time of the disaster.

Furthermore, in the power management system 1 according to the embodiment, in a case where the power feeding vehicle 10 acquires a feeding request signal from the feeding target facility 20 through the network NW, the power feeding vehicle 10 may proceed, for the power feeding, to the feeding target facility 20 that outputs the feeding request signal.

Figure 9:
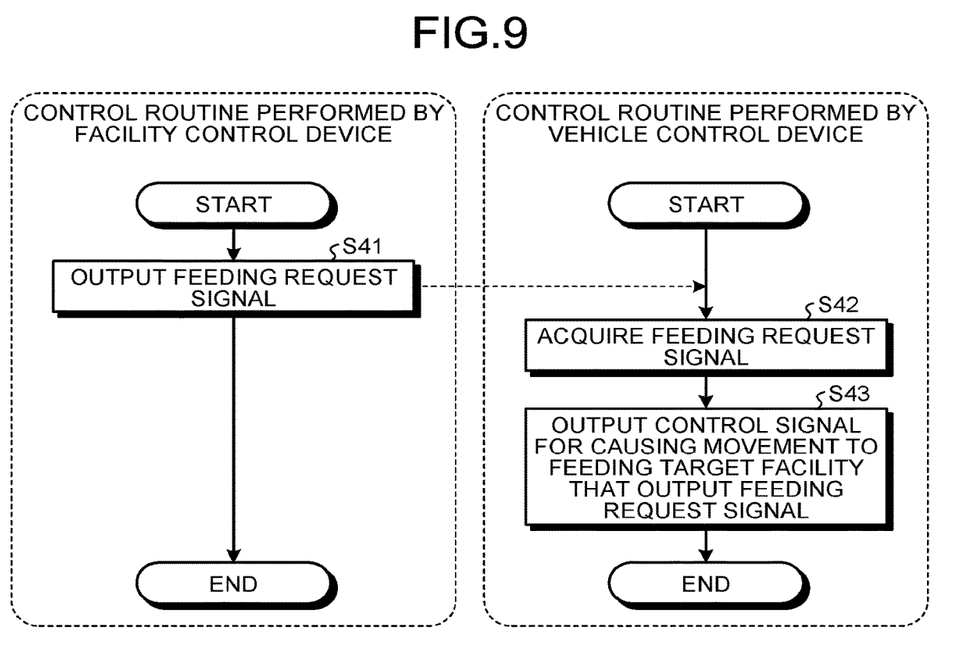
FIG. 9 is a flowchart illustrating a feeding control routine based on a feeding request signal from the feeding target facility.

FIG. 9 is a view illustrating a feeding control routine based on the feeding request signal from the feeding target facility 20. Note that the control routine illustrated in FIG. 9 is performed by cooperation of the vehicle control device 11 and the facility control device 21, and includes a control routine executed by the vehicle control device 11 and a control routine executed by the facility control device 21.

First, the facility control device 21 outputs the feeding request signal to the power feeding vehicle 10 through the network NW or the like (Step S41). Then, the facility control device 21 ends the present control routine.

Subsequently, the vehicle control device 11 acquires the feeding request signal from the facility control device 21 through the network NW or the like (Step S42). Then, the vehicle control device 11 outputs, to the drive device, a control signal for moving the power feeding vehicle 10 to the feeding target facility 20 that outputs the feeding request signal (Step S43). Then, the vehicle control device 11 ends the present control routine.

As a result, at the time of the disaster, the power feeding vehicle 10 may feed power to the feeding target facility 20 that requires the power feeding, for example, even in a case where the server 30 may not be used.

Further effects and modification examples may be easily derived by those skilled in the art. Broader aspects of the present disclosure are not limited by the specific details and representative embodiments that are illustrated and described in the above manner. Thus, various modifications may be made without departing from the sprit or scope of a general concept of the disclosure defined by the accompanying claims and an equivalent thereof. For example, the vehicle control device 11 may directly acquire the disaster information from the disaster information management device 50 through the network NW or the like, and output, to the drive device, a control signal for moving the power feeding vehicle 10 to the feeding target facility 20 in such a manner that the power feeding vehicle 10 automatically heads for the power feeding to the feeding target facility 20 having high importance at the time of the disaster, such as a hospital. In addition, for example, the vehicle control device 11 may acquire an emergency signal such as an SOS from the feeding target facility 20 through the network NW or the like, and output, to the drive device, a control signal for causing the power feeding vehicle 10 to move to the feeding target facility 20 in such a manner that the power feeding vehicle 10 automatically heads for the power feeding to the feeding target facility 20 that outputs the emergency signal.

The present disclosure has an effect of enabling power feeding from the power feeding vehicle to the server in a case where the communication between the power feeding vehicle and the server is interrupted.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device comprising:
   a processor configured to output, in a case where communication between a server instructing a power feeding vehicle to proceed for power feeding to a feeding target facility and the power feeding vehicle is interrupted, a control signal for causing the power feeding vehicle to move to an installation site of the server.

2. The control device according to claim 1, wherein the processor is configured to output a control signal for causing the power feeding vehicle to move to the feeding target facility in a case where a power feeding instruction with respect to the feeding target facility is acquired from the server.

3. The control device according to claim 2, wherein the processor is configured to output a control signal for causing the power feeding vehicle to move to a charging facility configured to charge an in-vehicle battery provided in the power feeding vehicle before causing the power feeding vehicle to proceed to the feeding target facility.

4. The control device according to claim 3, wherein the processor is configured to output the control signal for causing the power feeding vehicle to move to the charging facility in a case where a remaining amount of the in-vehicle battery is smaller than a predetermined value.

5. The control device according to claim 1, wherein the processor is configured to output a control signal for causing the power feeding vehicle to move to a charging facility configured to charge an in-vehicle battery provided in the power feeding vehicle before predicted occurrence time of disaster.

6. The control device according to claim 1, wherein the processor is configured to output a control signal for causing the power feeding vehicle to move to the feeding target facility in a case where a feeding request signal from the feeding target facility is acquired.

7. A non-transitory computer-readable recording medium on which a program is recorded, the program instructing a processor of a computer to execute:
   outputting, in a case where communication between a server instructing a power feeding vehicle to proceed for power feeding to a feeding target facility and the power feeding vehicle is interrupted, a control signal for causing the power feeding vehicle to move to an installation site of the server.

8. The non-transitory computer-readable recording medium according to claim 7, wherein the program instructs the processor to execute outputting of a control signal for causing the power feeding vehicle to move to the feeding target facility in a case where a power feeding instruction with respect to the feeding target facility is acquired.

9. The non-transitory computer-readable recording medium according to claim 8, wherein the program instructs the processor to execute outputting a control signal for causing the power feeding vehicle to move to a charging facility configured to charge an in-vehicle battery provided in the power feeding vehicle before proceeding to the feeding target facility.

10. The non-transitory computer-readable recording medium according to claim 9, wherein the program instructs the processor to execute outputting the control signal for causing the power feeding vehicle to move to the charging facility in a case where a remaining amount of the in-vehicle battery is smaller than a predetermined value.

11. The non-transitory computer-readable recording medium according to claim 7, wherein the program instructs the processor to execute outputting a control signal for causing the power feeding vehicle to move to a charging facility configured to charge an in-vehicle battery provided in the power feeding vehicle before predicted occurrence time of disaster.

12. The non-transitory computer-readable recording medium according to claim 7, wherein the program instructs the processor to execute outputting a control signal for causing the power feeding vehicle to move to the feeding target facility in a case where a feeding request signal from the feeding target facility is acquired.

13. A power management system comprising:
   a server including
      a first processor configured to instruct a power feeding vehicle to proceed for power feeding to a feeding target facility; and
   a control device including
      a second processor configured to output a control signal for causing the power feeding vehicle to move to an installation site of the server in a case where communication between the server and the power feeding vehicle is interrupted.

14. The power management system according to claim 13, wherein the first processor is configured to output a signal of a server feeding instruction for causing the power feeding vehicle to proceed for power feeding to the server in a case where the communication between the power feeding vehicle and the server is interrupted, to the second processor when the communication between the power feeding vehicle and the server is possible.

15. The power management system according to claim 14, wherein the first processor is configured to
   select, from a plurality of the power feeding vehicles, the power feeding vehicle of a power feeding method corresponding to a power receiving method of the server, and
   output the signal of the server feeding instruction to the selected power feeding vehicle.

16. The power management system according to claim 14, wherein
   the first processor is configured to output, to the second processor, a signal of a power feeding instruction for causing the power feeding vehicle to proceed for the power feeding to the feeding target facility based on disaster information, and
   the second processor is configured to output a control signal for causing the power feeding vehicle to move to the feeding target facility based on the acquired signal of the power feeding instruction.

17. The power management system according to claim 16, wherein the second processor is configured to output a control signal for causing the power feeding vehicle to move to a charging facility configured to charge an in-vehicle battery provided in the power feeding vehicle, before proceeding to the feeding target facility.

18. The power management system according to claim 17, wherein the second processor is configured to output the control signal for causing the power feeding vehicle to move to the charging facility in a case where a remaining amount of the in-vehicle battery is smaller than a predetermined value.

19. The power management system according to claim 13, wherein the first processor is configured to output, to the second processor, a signal of a pre-charge instruction for causing the power feeding vehicle to proceed to a charging facility configured to charge an in-vehicle battery provided in the power feeding vehicle, before predicted occurrence time of disaster in a case where disaster information is acquired.

20. The power management system according to claim 13, wherein the second processor is configured to output, in a case of acquiring a feeding request signal from the feeding target facility to which power is fed from the power feeding vehicle, a control signal for causing the power feeding vehicle to move to the feeding target facility.

* * * * *